United States Patent
Nakayama et al.

[11] Patent Number: 6,087,774
[45] Date of Patent: Jul. 11, 2000

[54] NON-ELECTRODE DISCHARGE LAMP APPARATUS AND LIQUID TREATMENT APPARATUS USING SUCH LAMP APPARATUS

[75] Inventors: Yoshio Nakayama, Mitaka; Makio Ishimitsu, Machida; Akihiro Inoue, Chigasaki; Shigehisa Kawatsuru, Yokosuka; Hiroshi Oonishi, Yokohama; Ichiro Yokozeki, Yokosuka, all of Japan

[73] Assignees: Kabushiki Kaisha Toshiba, Kawasaki; Toshiba Lighting & Technology Corporation, Tokyo, both of Japan

[21] Appl. No.: 08/960,411

[22] Filed: Oct. 29, 1997

[30] Foreign Application Priority Data

| Oct. 31, 1996 | [JP] | Japan | 8-289952 |
| Oct. 31, 1996 | [JP] | Japan | 8-289954 |
| Aug. 29, 1997 | [JP] | Japan | 9-233719 |

[51] Int. Cl.$^7$ ............................... H01J 61/00; H01J 7/26
[52] U.S. Cl. ............................ 313/607; 313/25; 313/35; 313/36
[58] Field of Search .................. 313/607, 634, 313/493, 35, 36, 635, 317, 234, 594, 113, 25, 110, 111, 112, 116

[56] References Cited

U.S. PATENT DOCUMENTS

| 3,274,429 | 9/1966 | Swiadek | 313/36 |
| 4,006,378 | 2/1977 | Silverstein et al. | 313/635 |
| 4,119,889 | 10/1978 | Hollister | 313/116 |
| 4,179,616 | 12/1979 | Coviello et al. | 313/36 |
| 5,008,593 | 4/1991 | Schilie et al. | 313/36 |
| 5,140,216 | 8/1992 | Darr | 313/25 |

FOREIGN PATENT DOCUMENTS

| 0 509 110 A1 | 10/1992 | European Pat. Off. . |
| 3842993A1 | 7/1990 | Germany . |
| 62-163297 | 7/1987 | Japan . |
| WO 95/19188 | 7/1995 | WIPO . |

OTHER PUBLICATIONS

Abstract from EPO, "UV Sterilizer"; Japanese Publication No. 03052688, publication date Jun. 3, 1991.
Abstract from EPO, "Fluid Sterilizing Device", Japanese Publication No. 01047491, publication date Feb. 21, 1989.
French Preliminary Search Report; 9713723; Kabushiki Kaisha Toshiba et al., Dec. 18, 1998.

*Primary Examiner*—Michael H. Day
*Assistant Examiner*—Joseph Williams
*Attorney, Agent, or Firm*—Christensen O'Connor Johnson & Kindness PLLC

[57] ABSTRACT

A non-electrode discharge lamp apparatus comprises a discharge tube, exciting coils wound on an outer periphery of the discharge tube, a vessel, having liquid-tightness, containing the discharge tube and the exciting coil means, and lead line guiding means for guiding lead lines connected to the exciting coils to the outside of the vessel, thereby supplying high frequency electric power to the exciting coils through the lead lines. Liquid is prevented from directly contacting the discharge tube and the exciting coils, temperature of the discharge tube can be suitably maintained, and an irradiation efficiency of ultraviolet rays can be prevented from being reduced.

19 Claims, 10 Drawing Sheets

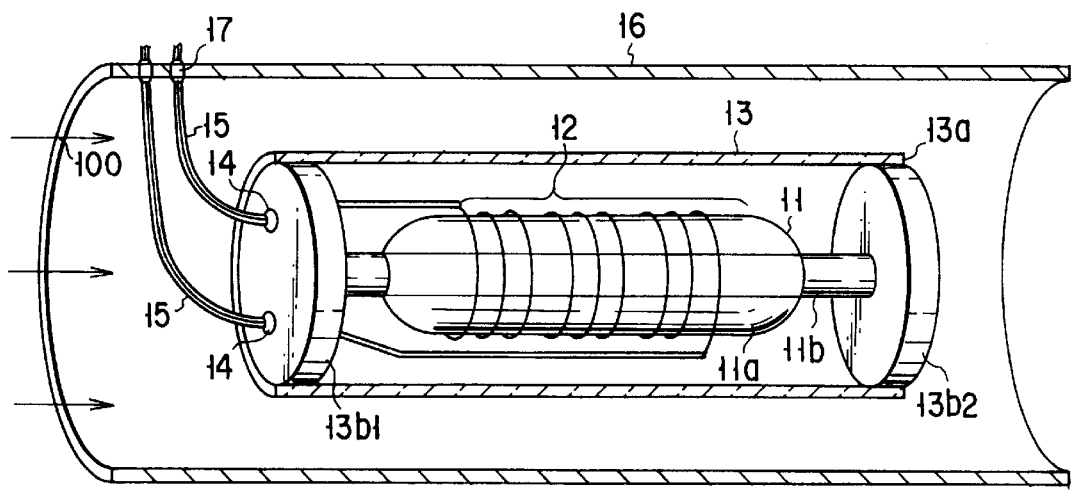
F I G. 2

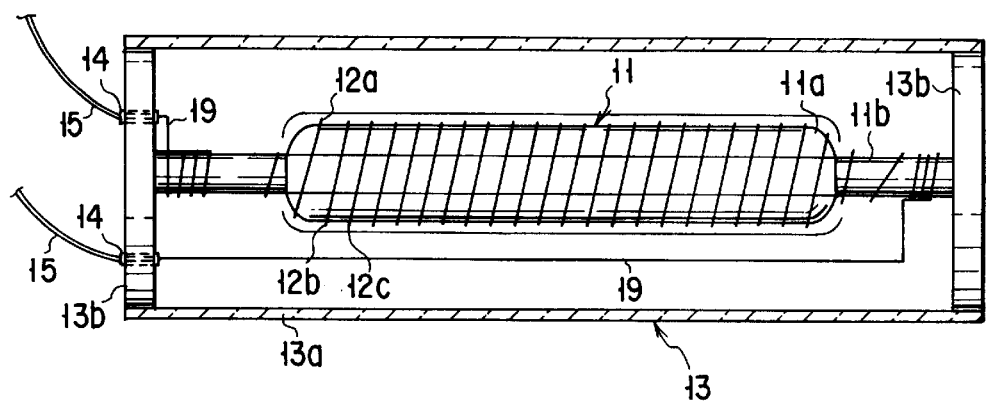
F I G. 5
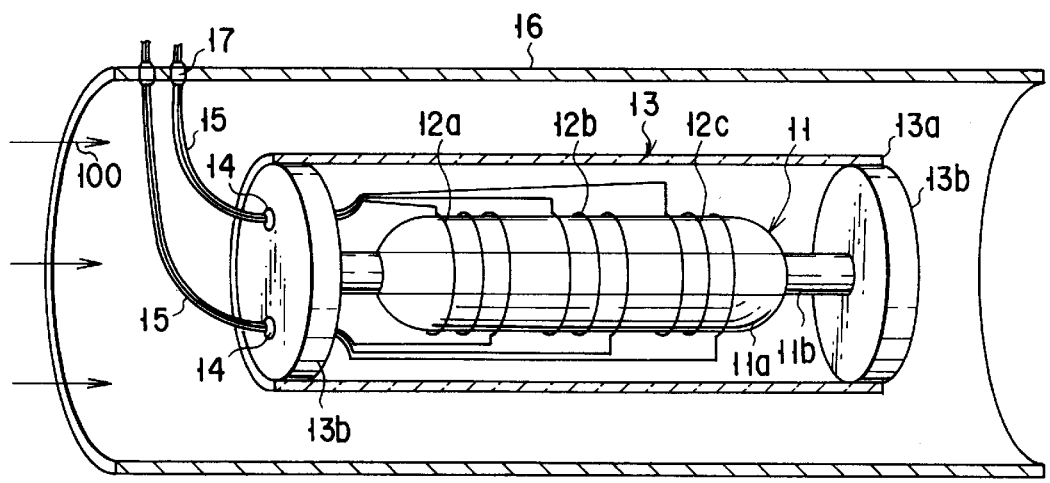
F I G. 6

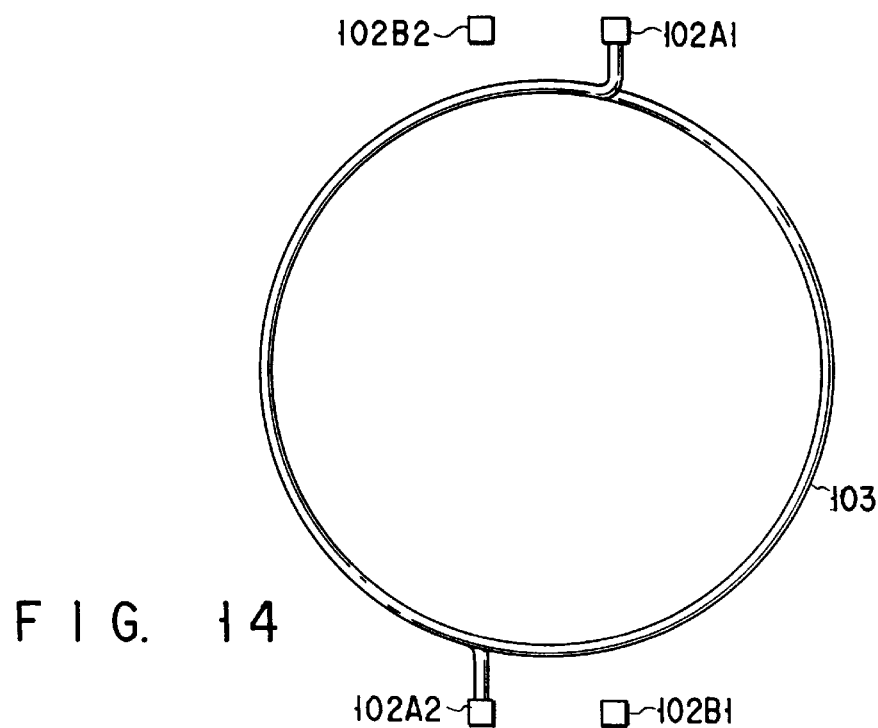
F I G. 14
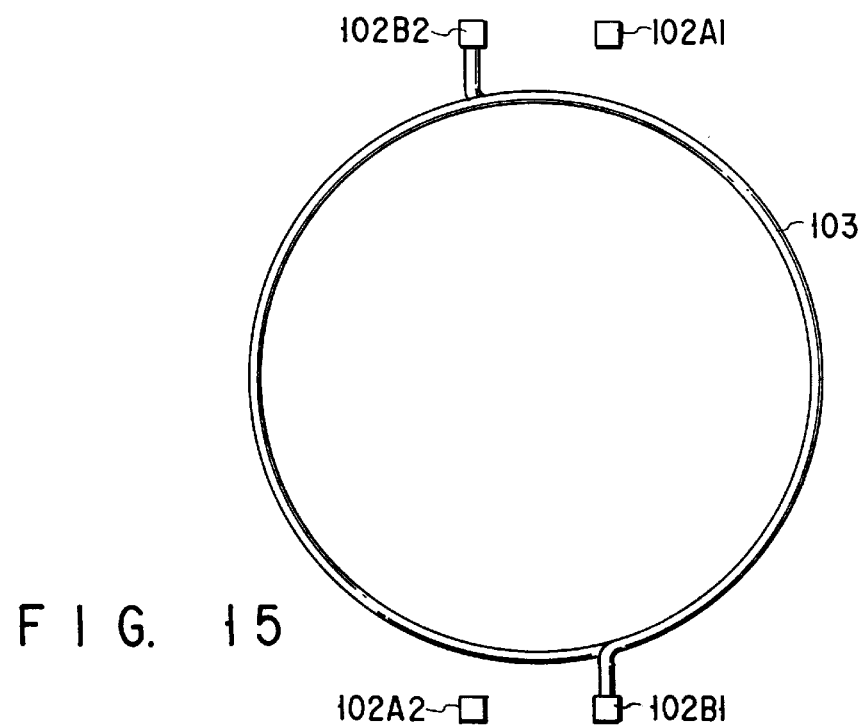
F I G. 15

NON-ELECTRODE DISCHARGE LAMP APPARATUS AND LIQUID TREATMENT APPARATUS USING SUCH LAMP APPARATUS

BACKGROUND OF THE INVENTION

The present invention relates to a discharge lamp apparatus having no electrode, that is, a non-electrode discharge lamp apparatus, and a liquid treatment apparatus for treating liquid such as water with ultraviolet rays emitted from such a lamp apparatus.

More particularly, in the non-electrode discharge lamp apparatus dipped in liquid, the present invention relates to a lamp apparatus having an improved support structure of a discharge tube and an improved feeding structure and to a liquid treatment apparatus using such a lamp apparatus.

As a conventional non-electrode discharge lamp apparatus, there is an apparatus disclosed in Japanese Patent Application KOKOKU Publication No. 62-163927. This apparatus has the structure as shown in FIG. 1. More specifically, the lamp apparatus comprises a cylindrical discharge tube 1, and the interior of the discharge tube 1 is filled with mercury and rare gas. Then, a plurality of exciting coils 2a, 2b, and 2c are wound around an outer periphery of the discharge tube 1. These exciting coils 2a, 2b, and 2c are connected to each other in parallel, and a high frequency current is supplied thereto from a high frequency generator 3. Reference numeral 4 is a commercial power supply source.

In such a lamp apparatus, when the high frequency current is supplied to the exciting coils 2a, 2b, and 2c, a light emitting region is formed in the discharge tube 1. Then, ultraviolet rays are emitted to the outside through a tube wall of the discharge tube 1. In this kind of the lamp apparatus, the exciting coil is divided into three, that is, exciting coils 2a, 2b, 2c, and these coils are connected to each other in parallel. As a result, inductance of the assembly of these exciting coils is reduced, the necessary amount of apply voltages may be small, and this brings about an advantage in the circuit design of the high frequency generator 3.

This kind of non-electrode discharge lamp is used in various kinds of liquid treatment apparatus in which ultraviolet rays are emitted to e.g., sewage to be sterilized. In the general structure, the non-electrode discharge lamp apparatus is dipped in liquid such as sewage, and ultraviolet rays are efficiently emitted to sewage.

However, this kind of non-electrode discharge lamp has the following disadvantages:

First of all, if the discharge tube 1 is dipped in sewage directly contacts the tube wall of the discharge tube 1, the tube wall is excessively cooled. In this type of the discharge lamp apparatus, radiation efficiency of the ultraviolet rays becomes the highest when the temperature of the coolest portion of the tube wall of the tube 1 is around 40° C. However, since the tube wall is excessively cooled, the temperature of sewage is also reduced. As a result, the radiation efficiency of the ultraviolet rays is largely reduced.

Moreover, if sewage contacts the exciting coils 2a, 2b, and 2c, inductance of these coils changes by the dielectric constant of sewage. Then, the dielectric constant of sewage is not fixed. As a result, the efficiency of these exciting coils varies, and the generation efficiency of the ultraviolet rays is reduced.

Furthermore, if sewage directly contacts the exciting coils, their feeders, terminal, etc., a water-proof treatment and an insulating treatment must be completely prepared. As a result, the structure becomes complicated, and reliability is reduced.

BRIEF SUMMARY OF THE INVENTION

An object of the present invention is to provide a non-electrode discharge lamp apparatus, which can eliminate the above-mentioned disadvantages, and which has high efficiency and reliability, and a simple structure, and a liquid treatment apparatus using such a non-electrode discharge lamp apparatus.

The non-electrode discharge lamp apparatus of the present invention comprises a vessel, having a liquid-tight structure, containing a discharge tube and exciting coils wound on the outer periphery. The vessel has one or two lead line guiding section having a liquid-tight structure to insert lead lines for supplying high frequency electric power from an outer section.

As a result, the discharge tube and the exciting coils do not directly contact liquid such as sewage. The temperature of the tube wall of the discharge tube can be maintained to be in a range where irradiation efficiency of ultraviolet rays is the highest. Since the exciting coils do not contact liquid, unfavorable influence is exerted on inductance of the exciting coils by dielectric constant of liquid, and the efficiency is not reduced.

The number of portions for guiding the lead lines to the vessel may be one or two even if an earth line is includes. Since no liquid contacts the coils arranged in the vessel and the conduct lines and terminals, no water-proof treatment is required, so that the structure becomes simple, and reliability can be improved.

According to the favorable embodiment of the present invention, the discharge tube and the vessel are cylindrically shaped. Also, attaching projection portions are formed from both end portions of the discharge tube. These attaching projection portions are held by these attaching projection portions, thereby, the discharge tube is maintained at a predetermined position in the vessel.

In other words, a continuous cross-sectional annular space with no obstacle is ensured between the outer peripheral surface of the discharge tube and the inner peripheral surface of the vessel. As a result, the exciting coils ad the lead lines can be easily provided in the annular space, and the number of members for supporting the exciting coils, etc, becomes minimum. The structure can be made simple, and the interruption of irradiation energy of ultraviolet rays transmitted through the discharge tube and the peripheral wall of the vessel can be minimized.

Also, according to the preferable embodiment of the present invention, the exciting coils are formed of a plurality of independent exciting coils. These exciting coils are electrically connected in parallel. As a result, inductance of the entire exciting coils is reduced, and the voltage of the high frequency power to be supplied can be reduced, so that a high frequency oscillator can be easily designed and manufactured. In this case, the structure of the lead liens for supplying high frequency power to the plurality of exciting coils and the structure of the terminals become complicated. However, since these members are contained in the vessel, no water-proof treatment is not required, so that the complication of the structure is not brought about.

Moreover, according to the preferable embodiment of the present invention, at least one pair of coil support bars is separated from the discharge tube, and extended in an axial direction. These coil support bars, which are made of conductive material, serve as both a feeder to the excitation coils and a mechanical support. Therefore, the structure is simple, and the support of the exciting coils can be ensured, and reliability can be improved.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a partly broken away, perspective view showing a non-electrode discharge lamp apparatus according to a first embodiment of the present invention;

FIG. 5 is a vertical cross-sectional view showing the non-electrode discharge lamp apparatus according to a fourth embodiment of the present invention;

FIG. 6 is a partly broken away, perspective view showing a non-electrode discharge lamp apparatus according to a fifth embodiment of the present invention;

FIG. 14 is a cross-sectional view showing exciting coils taken along line 14—14 of FIG. 11;

FIG. 15 is a cross-sectional view showing exciting coils taken along line 15—15 of FIG. 11;

DETAILED DESCRIPTION OF THE INVENTION

Figure 1:
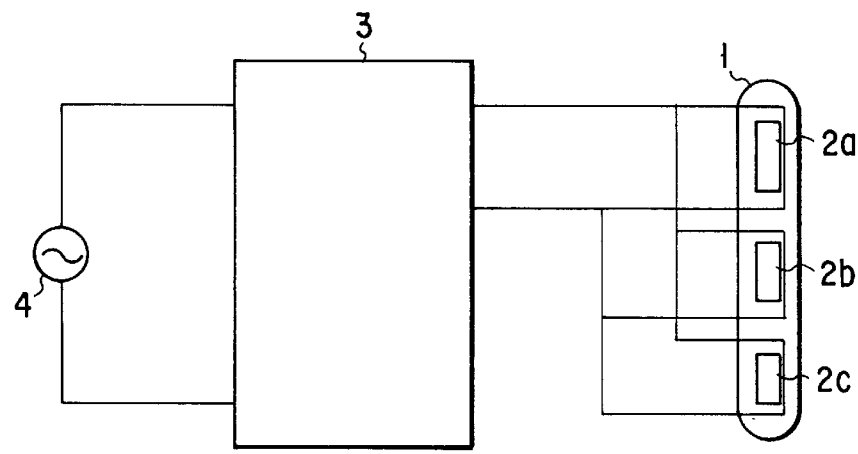
FIG. 1 is an outline view showing the structure of a conventional non-electrode discharge lamp apparatus.

The embodiments of the present invention will now be described with reference to the accompanying drawings.

FIG. 2 is a partly broken away, perspective view showing the structure of the non-electrode discharge lamp apparatus according to the first embodiment of the present invention.

Reference numeral 11 is a discharge tube, which is formed of quartz. The cross-section of the tube 11 is a ring-shaped double tube structure to form a discharge space. The discharge tube 11 comprises an outer tube 11a and an inner tube 11b. Reference numeral 12 is exciting coils wound around the outer peripheral portion of the outer tube 11a of the discharge tube 11. Each coil is independently formed. Reference numeral 13 is a vessel (case) comprising an outer tube 13a and flanges 13b1 and 13b2. The vessel 13 has a diameter enough to contain the discharge tube 11. The outer tube 13a is formed of cylindrical ultraviolet transmitting material such as quartz, alumina, ceramics. The flanges 13b1 and 13b2 are formed of circular plastic or metal. The flanges 13b1 and 13b are structured such that the opening end of the outer tube 13a is closed up tightly to prevent treating water from being introduced to the interior of the outer tube 13a. Reference numeral 14 is guide holes for guiding a pair of lead lines 15 to the interior of the vessel 13. The guide holes 14 are structured to be airtight to prevent treating water from being introduced to the interior of the vessel 13. Reference numeral 15 is lead lines, which are coated with insulating material such as ceramic, for supplying a high frequency current to the exciting coils 12. The lead lines 15 are connected to the exciting coils 12 in the vessel 13. Reference numeral 16 is a flow tube, which is formed of iron. Treating Water (water 100) flows thereto. The flow tube 16 has a diameter enough to contain the vessel 13 therein. Reference numeral 17 is lead holes each having a watertight structure. The lead holes 17 draw the lead lines 15 to the outer portion of the flow tube 16. The lead holes 17 are structured to be watertight such that water 100 is prevented from being leaked outside.

The following will explain the structure and the operation of the non-electrode discharge lamp apparatus according to the first embodiment.

Specifically, the non-electrode discharge lamp, which comprises the discharge tube 11 and the exciting coils 12 wound around the outer peripheral portion of the discharge tube 11, is contained in the vessel 13. The interior of the outer tube 11a of the discharge tube 11 is filled with mercury and rare gas. The exciting coils 12, which are wound around the outer peripheral portion of the discharge tube 11, are connected to the pair of lead lines 15 in parallel. The lead lines 15 are inserted from the pair of guiding holes 14 formed on the flange 13b1. These lead lines 15 are drawn to the outer portion of the flow tube 16 through the lead holes.

The inner tube 11b of the discharge tube 11 is longer than the outer tube 11b of the discharge tube 11. Both end portions of the inner tube 11b are structured as an attaching projection portion for the discharge tube. The end portions are inserted to the flanges 13b1 and 13b2. As a result, the inner tube 11b is supported by the flanges 13b1 and 13b2, and the discharge tube 11 is fixed not to be moved in the vessel 13.

The high frequency current is supplied to the lead lines 15 from a high frequency supply source (not shown). The high frequency current is supplied to the exciting coils 12 wound around the outer peripheral portion of the discharge tube 11. Thereby, discharge occurs in the discharge tube 11, and a mercury atom in the interior of the discharge tube 11 is excited by the discharge. Then, ultraviolet rays of, e.g., 254 nm, 185 nm, which is useful for sterilization, are emitted. The interior of the flow tube 16 is irradiated with the ultraviolet rays through a wall surface of the outer tube 13ba of the vessel 13. Water 100 flowing in the flow tube 16 is sterilized with the ultraviolet rays. Then, water 100 flows downstream.

Since the discharge tube 11 is in the vessel 13, treating water does not directly contact the tube wall of the discharge tube 11. Due to this, if the discharge tube 11 is once turned on, the tube wall of the discharge tube 11 is not reduced to the temperature of the treating water by a heat insulation effect due to heat generated from the discharge tube 11 and the vessel 13. In other words, the tube wall is maintained at the temperature of near 40° C., which brings about a good irradiation efficiency of the ultraviolet rays from the mercury atom.

According to the embodiment of the present invention, the attaching projection portion of both ends of the inner tube 11b of the discharge tube 11 constituting the double tube is supported by the flanges 13b1 and 13b2 without using the special member as a support mechanisms of the discharge tube 11. As a result, the discharge tube can be easily fixed to the vessel 13. The discharge tube 11 is not moved in the vessel 13. Moreover, it is possible to reduce trouble in which the discharge tube 11 collides with the wall surface of the vessel 13 and the discharge tube 11 is broken. In addition, since ultraviolet rays from the discharge tube 11 is not interrupted by the support mechanism of the discharge tube 11, the irradiation efficiency of the ultraviolet rays can be maintained well. Since the support mechanism of the discharge tube 11 is simple, the non-electrode discharge lamp apparatus can be easily manufactured with low cost.

Thus, the non-electrode discharge lamp having the discharge tube 11 and the exciting coils 12 is contained in the vessel 13. As a result, water 100 as treating water does not directly contact the tube wall of the discharge tube 11. By the heat insulation effect of the vessel 13, the tube wall of the discharge tube 11 can be maintained at near 40° C. while the discharge tube 11 is turned on. Due to this, the irradiation efficiency of the ultraviolet rays from the non-electrode discharge lamp can be obtained as designed, and sterilizing effect against water 100 can be obtained as expected.

The distance between the outer wall of the outer tube 11a of the discharge tube 11 and the inner wall of the outer tube 13a of the vessel 13 is structured to be 1/10 of the diameter of the exciting coil 12. As a result, the dielectric constant of water flowing to the outside of the vessel 13 has no influence upon inductance of the exciting coils 12. As a result, electromagnetic energy can be efficiently supplied to the interior of the discharge tube 11 from the exciting coils 12.

Both ends of the inner tube 11b are sandwiched by the flanges 13b1 and 13b2 and pressing force is applied thereon so as to support the inner tube 11b. Thereby, the same effect as mentioned above can be also obtained. In other words, the inner tube 11b of the discharge tube 11 may be supported by some relationship between the flanges 13b1 and 13b2. Moreover, an object to be sterilized may be not only water but also liquid containing water, liquid chemical material, and the same effect can be obtained.

Figure 3:
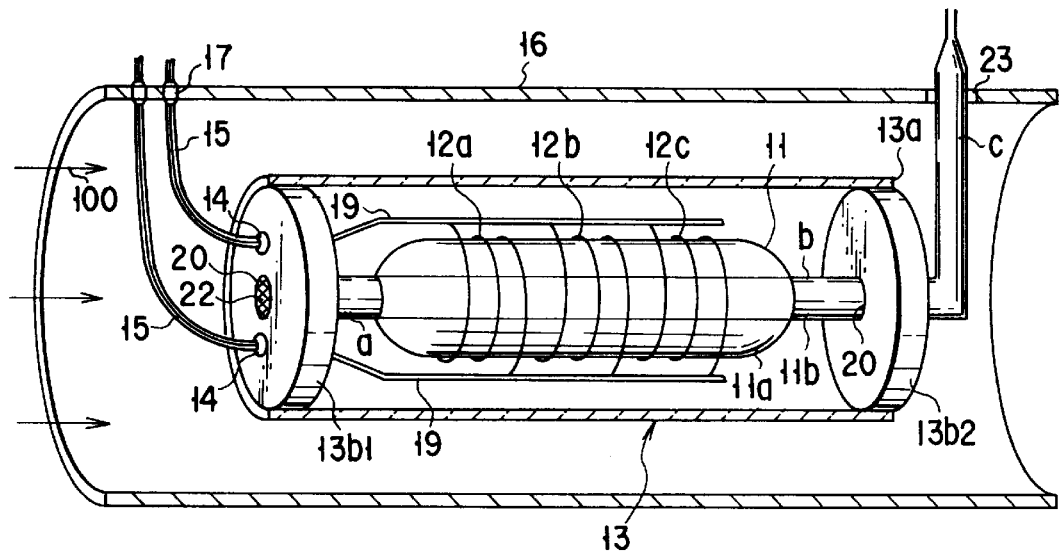
FIG. 3 is a partly broken away, perspective view showing a non-electrode discharge lamp apparatus according to a second embodiment of the present invention.

FIG. 3 is a partly broken away, perspective view showing a non-electrode discharge lamp apparatus according to a second embodiment of the present invention.

On the outer peripheral portion of the discharge tube 11 of the non-electrode discharge lamp contained in the vessel 12, exciting coils 12a, 12b, and 12c are wound. Also, a pair of wires 19 is provided along a longitudinal direction of the discharge tube 11. The wires 19 are positioned extremely close to the outer peripheral portion of the discharge tube 11. The exciting coils 12a, 12b, and 12c are electrically connected to the wires 19 in parallel. One end of each of the wires 19 is connected to each of lead lines 15, which are inserted into the vessel 13 from the guide holes 14 formed on the flange 13b1. The discharge tube 11 is the double tube structure having the outer tube 11a and the inner tube 11b. A top end of the inner tube 11b, which is longer than the outer tube 11a, is inserted to a through hole 20 leading to the center of the flange 13b1. The other end portion is passed through the through hole 20 leading to the center of the flange 13b2 so as to be extended to the outside of the vessel 13. An extension c of the inner tube is bent at right angles in the middle, and pulled out to the outer portion of the tube 16 through a through hole 23 of the water tight structure formed on the wall surface of the tube 16. A porous filter (porous material) 22 is inserted onto the opening portion of the through hole 20 formed on the flange 13b1.

In the discharge tube 11, a top end portion a of the inner tube 11b is inserted to the through hole 20 of the flange 13b1, and an end portion b of the opposite side is passed through the through hole of the flange 13b2. As a result, the discharge tube 11 is supported by the flanges 13b1 and 13b2 to be fixed. The other structure is the same as the first embodiment of the present invention.

Next, the following will explain an operation of the embodiment of the present invention.

The high frequency current is supplied to the lead lines 15, which are drawn to the outer portion from the lead holes 17, from a high frequency power supply (not shown). The high frequency current is supplied to the exciting coils 12a, 12b, and 12c wound on the outer peripheral portion of the discharge tube 11. Thereby, the discharge occurs in the outer tube 11a, and ultraviolet rays of, e.g., 254 nm, 185 nm, which is useful for sterilization, are emitted thereto. Water 100, which flows into the tube 16, is irradiated with the ultraviolet rays through the vessel 13 so as to be sterilized. At the same time, a compressor (not shown) is connected to the extension portion c of the inner tube 11b drawn to the outer portion of the tube 16 from the through hole 23. Then, air is sent to the extension portion c from the compressor. Thereby, air in the inner tube 11b is exposed to the ultraviolet rays from the discharge space of the outer tube 11a, so that ozone is generated. Then, air containing ozone is changed to countless bubbles to be jetted into water from the filter 22. As a result, water 100 contacting ozone is sterilized. The outer tube 11a is normally made of quartz through which mercury radiation of 253 nm is passed well. The inner tube 11b is made of the so-called synthetic quartz having high ultraviolet transmittance of 185 nm to increase an ozone generation efficiency. The filter 22, which is formed of porous ceramics, has ventilation such that the treating water is prevented from being introduced into the inner tube 11b, and that air of the inner tube is jutted into the flowing water.

According to the embodiment of the present invention, the attaching projection portion of both ends of the inner tube 11b of the discharge tube 11 constituting the double tube is supported by the flanges 13b1 and 13b2 without using the special member as a support mechanism of the discharge tube 11. As a result, the discharge tube can be easily fixed to the vessel 13. The discharge tube 11 is not moved in the vessel 13. Moreover, the top end portion of the inner tube 11b is passed through the flange 13b2 to be drawn to the outside of the vessel 13, and the extension c of the inner tube 11b is used as a passage for sending air to the inner tube 11b. As a result, the structure for sending air for the ozone generation to the inner tube 11b can be considerably simplified, and the non-electrode discharge lamp apparatus can be easily manufactured with low cost.

Also, the extension c for sending air to the inner tube 11b is drawn to the outside from the axial central portion of the discharge tube 11. As a result, the ultraviolet rays from the discharge space of the outer tube 11a are not interrupted, and water 100 can be efficiently irradiated with the ultraviolet rays.

Moreover, the ultraviolet rays sent to the inner tube 11b ozonizes air to be sent to the inner tube 11b. Then, ozone is jetted into water to be used to sterilize water 100. As a result, water 100 can be sterilized with not only ultraviolet rays but also ozone, so that sterilization can be efficiently executed.

The exciting coil is divided to the plurality of numbers to be connected to the lead lines 15 in parallel. As a result, induction of the exciting coils is lowered, seeing from the lead lines 15, and unfavorable influence due to the dielectric constant of water 100 can be reduced. Also, since it is unnecessary to constantly apply the high voltage to the exciting coils. As a result, there can be made easy the circuit design of the high frequency power supply source (not shown) for supplying the high frequency current to the coil exciting coils 12a, 12b, and 12c.

Furthermore, the current passage is separated to the plurality of exciting coils from the lead lines introduced into the vessel 13. As a result, the number of guide holes 14, which are formed on the flanges 13b, can be at most two. The manufacturing cost of the vessel 13 can be reduced, and danger of water leakage from the water tight structure of the hole 14 can be reduced. Thereby, reliability of the vessel 13 can be improved. Thus, the above-mentioned effect can be obtained in addition to the same effect as the first embodiment shown in FIG. 1. The top end of the inner tube 11b is projected to the outer portion of the flange 13b1 through the through hole 20 formed on the flange 13b1. Even if the porous cover is attached to the opening portion of the projected inner tube 11b, the same effect can be obtained.

Figure 4:
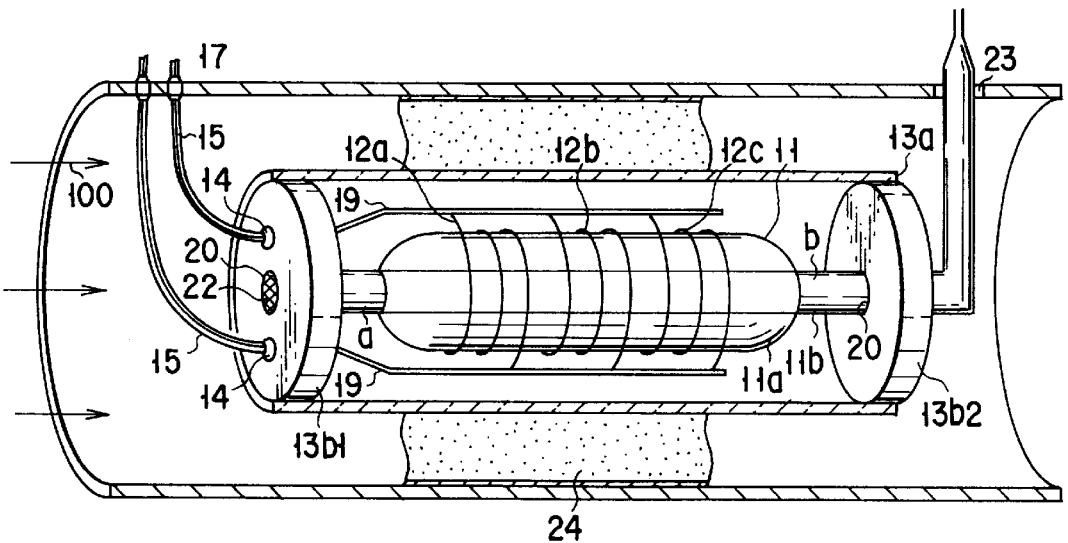
FIG. 4 is a partly broken away, perspective view showing a non-electrode discharge lamp apparatus according to a third embodiment of the present invention.

FIG. 4 is a partly broken away, perspective view showing a non-electrode discharge lamp apparatus according to a third embodiment of the present invention.

In this embodiment, an optical semiconductor member 24 such as titanium oxide is applied onto the inner wall of the tube 16, which is positioned close to the non-electrode discharge lamp contained in the vessel 13. If the optical semiconductor member 24 receives the ultraviolet rays from the non-electrode discharge lamp, an active electron is generated. The active electron sterilizes water 100 or decomposes organic matter in water 100. The other structure is the same as the second embodiment of FIG. 3.

According to this embodiment, the optical semiconductor member 24 is irradiated with the ultraviolet rays passed through water 100, so that the active electron is generated. The active electron sterilizes water 100 or decomposes organic matter in water 100. Thus, by the sterilization of water 100 and the decomposition of the organic matter due to the ultraviolet rays and ozone, water can be efficiently treated. The other effects are the same as the effects of the second embodiment of FIG. 3. In this case, the non-electrode discharge lamp shown in FIG. 2 may be used, and water 100 can be efficiently sterilized with the ultraviolet rays and the active electron.

FIG. 5 is a vertical cross-sectional view showing the non-electrode discharge lamp apparatus according to a fourth embodiment of the present invention.

Some pressure force is applied onto the top end of the inner tube 11b, which is longer than the outer tube 11a, by the flanges 13b1 and 13b2 constituting the vessel 13 so as to support the inner tube 11b. Thereby, the discharge tube 11 is fixed to the vessel 13. Also, the end portions of three exciting coils 12a, 12b, and 12c, which are wound on the outer periphery of the outer tube 11a, are wound on the portion projected from the outer tube 11a. Then, these end portions are electrically connected to the wires 19 in parallel at a portion close to the inner tube 11b. In this case, the wires 12a, 12b, and 12c are uniformly wound on the entire surface of the outer peripheral portion of the outer tube 11a, respectively.

According to the above-mentioned embodiment, the end portions of three exciting coils 12a, 12b, and 12c are wound on the portion projected from the outer tube 11a. These end portions are electrically connected to the wires 19 in parallel at the portion close to the inner tube 11b. Thereby, the parallel connection wire to the exciting coils 12a, 12b, and 12c can be fixed, with the simple structure, to the outside of the outer tube 11a at the axial center of the discharge tube 11. As a result, the parallel connection wires to the exciting coils 12a, 12b, and 12c can be mechanically stably set. Moreover, since the parallel connection wires are not projected to the interior of the vessel 13, the internal space of the vessel 13 can be sufficiently maintained. Also, the parallel connection wire does not interrupt the ultraviolet rays from the discharge tube 11, so that water 100 can be efficiently irradiated with the ultraviolet rays.

FIG. 6 is a partly broken away, perspective view showing a non-electrode discharge lamp apparatus according to a fifth embodiment of the present invention.

In this embodiment, the current is fed to the plurality of exciting coils 12a, 12b, and 12c through the respective lead lines branched from the lead lines 14 and 15. The other points are the same as the first embodiment. In FIG. 6, the same reference numerals as the first embodiment are added to the portions corresponding to the first embodiment, and the explanation is omitted.

According to this embodiment, since the current is fed to the exciting coils 12a, 12b, and 12c through the respective lead lines branched from the lead lines 14 and 15, the current can be stably fed. In this embodiment, the structure of the lead lines is complicated. However, since the lead lines are contained in the vessel 13, the lead lines do not contact liquid. As a result, it is unnecessary to provide the waterproof treatment, and the complexity of the structure and the rise of the cost are not brought about.

Figure 7:
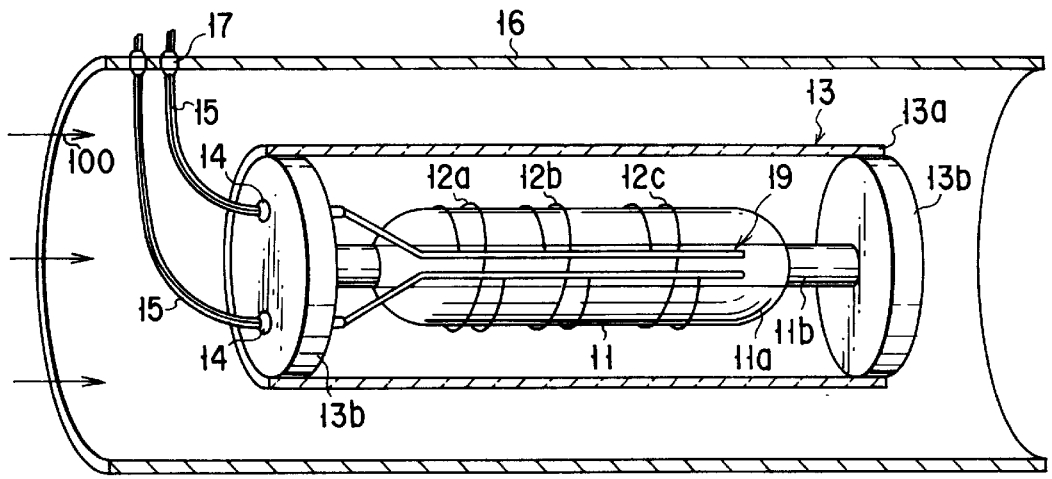
FIG. 7 is a partly broken away, perspective view showing a non-electrode discharge lamp apparatus according to a sixth embodiment of the present invention.
Figure 10:
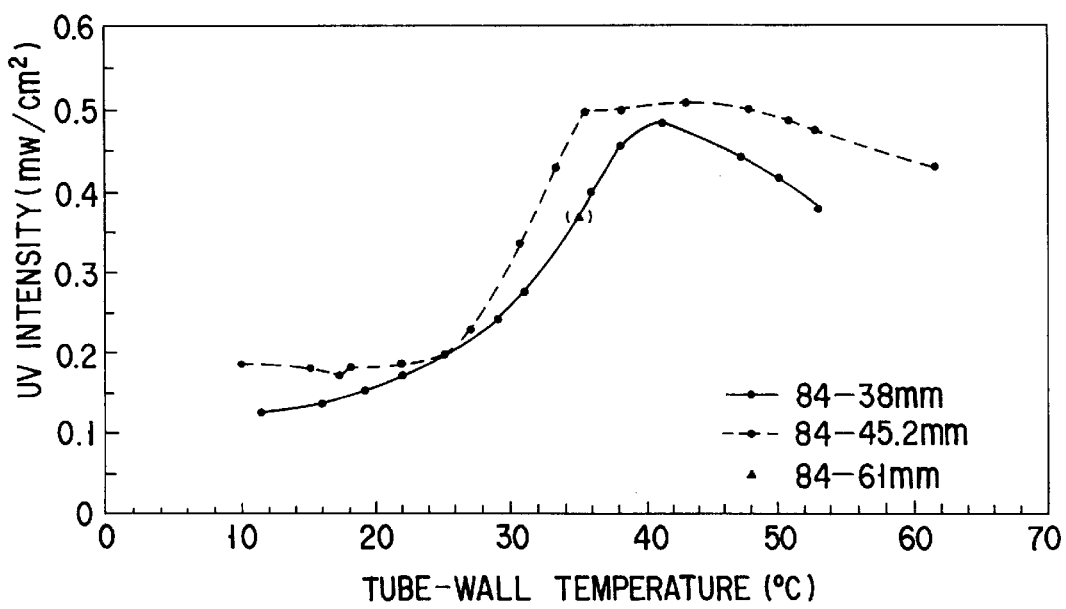
FIG. 10 is a line view showing a characteristic of the non-electrode discharge lamp apparatus.

FIG. 7 is a partly broken away, perspective view showing a non-electrode discharge lamp apparatus according to a sixth embodiment of the present invention.

This embodiment shows the improvement of the structure of the feeder to each of the exciting coils 12a, 12b, and 12c. On the outer peripheral portion of the discharge tube 11 of the non-electrode discharge lamp contained in the vessel 13, the exciting coils 12a, 12b, and 12c are wound. Also, the pair of wires 19 are provided along the longitudinal direction of the discharge tube 11. The wires 19 are wound and fastened with at least part of these coils to be fixed extremely close to the outer peripheral portion of the outer tube 11a of the discharge tube 11. The exciting coils 12a, 12b, and 12c are electrically connected to the wires 19. One end of each of the wires 19 is connected to each of the lead lines 15, which are inserted into the vessel from the guide hole 14. The other structure is the same as the first embodiment of FIG. 2.

In order to prevent the exciting coils from being shortcircuited, there are used exciting coils, which are coated with insulation material such as Teflon or ceramics through which ultraviolet rays are easily transmitted and which has a good ultraviolet ray resisting characteristic. Only the portion, which contacts the wires 19, may be coated with the insulation material. Or, no insulation coating is provided to the exciting coils 12a, 12b and 12c. Instead, the wires 19 may be coated with insulation material such as Teflon or ceramics to prevent the exciting coils from being shortcircuited. Or, the insulation coating may be provided to both the exciting coils and the wires.

According to this embodiment, the coils 12a, 12b, and 12c are connected in parallel to the wires 19 fixed extremely close to the outer peripheral portion of the discharge tube 11, and the current is fed to each coil. As a result, the structure of the current feeding to the exciting coils 12a, 12b, and 12c do not largely occupy the space of the vessel 12. Moreover, the irradiation of the ultraviolet rays from the discharge tube 11 is not interrupted by the parallel connected wires projected to the space. Therefore, as compared with the first embodiment of FIG. 2, the radiation efficiency of the ultraviolet rays can be improved, and water 100 can be efficiently sterilized. Since the wires 19 are arranged in parallel, they are not easily subjected to the influence of the magnetic field. Also, the start of the discharge tube 11 can be prevented from being lost. The other effect is the same as the effect of the first embodiment of FIG. 2.

Figure 8:
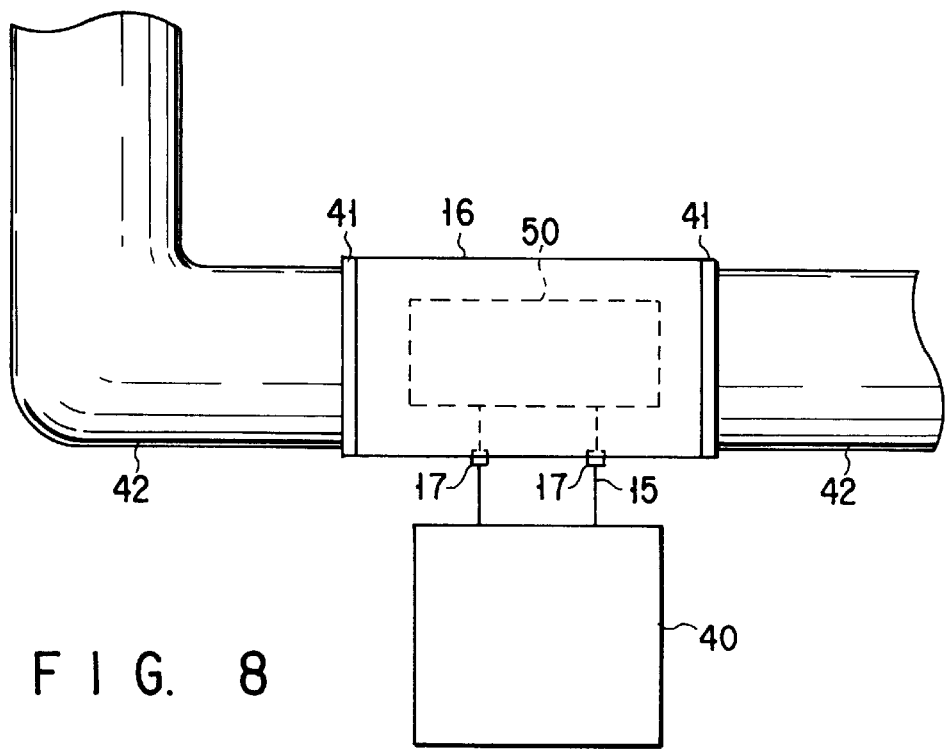
FIG. 8 is an outline view of the first embodiment of a liquid treatment apparatus using the non-electrode discharge lamp apparatus of the present invention.

FIG. 8 is a block diagram showing the structure of the first embodiment of a liquid treatment apparatus using the non-electrode discharge lamp apparatus of the present invention. In this embodiment, a non-electrode discharge lamp apparatus 50 having the same structure as shown in FIG. 2 is provided in the tube 16.

The lead lines 15 connected to the non-electrode discharge lamp apparatus 50 are drawn to the outer portion from the lead holes 17 formed on the tube wall of the tube 16, and connected to a high frequency power source 40. A high frequency current is supplied to the non-electrode discharge lamp apparatus 50 from the high frequency power source 40. The tube 16 is connected to water pipes 42 by connectors 41. Water flows into the tube 16 from the left water pipe 42 in the figure. Water in the tube 16 is sterilized by receiving the ultraviolet rays generated by the non-electrode discharge lamp apparatus 50, and sterilized water flows to the right water pipe 42 in the figure from the tube 16.

According to this embodiment, since the non-electrode discharge lamp apparatus 50 is contained in the vessel, the non-electrode discharge lamp apparatus 50 does not directly contact water. As a result, the temperature of the tube wall of the discharge tube can be maintained around 40° C. Then, the ultraviolet irradiation efficiency is not reduced, and water in the tube 16 can be irradiated with ultraviolet rays as designed. Moreover, sterilizing effect against water flowing in the tube 16 can be stably obtained as expected. In this case, even if the non-electrode discharge lamp apparatus 50 of FIG. 5 is used, the same effect can be obtained.

Figure 9:
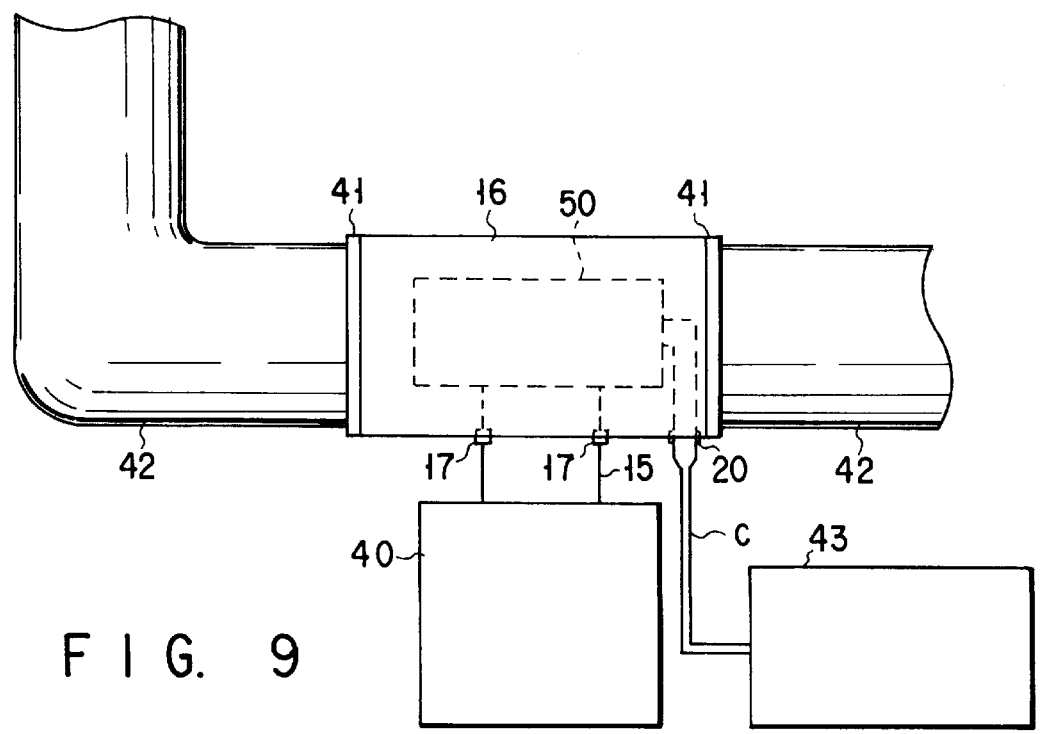
FIG. 9 is an outline view of the second embodiment of a liquid treatment apparatus using the non-electrode discharge lamp apparatus of the present invention.

FIG. 9 is a block diagram showing the structure of the second embodiment of a liquid treatment apparatus using the non-electrode discharge lamp apparatus of the present invention. In this embodiment, the non-electrode discharge lamp apparatus 50 having the same structure as shown in FIG. 3 is provided in the tube 16.

The lead lines 15 connected to the non-electrode discharge lamp apparatus 50 are drawn to the outer portion from the lead holes 17 formed on the tube wall of the tube 16, and connected to the high frequency power source 40. A high frequency current is supplied to the non-electrode discharge lamp apparatus 50 from the high frequency power source 40.

The extension C of the inner tube drawn to the outer portion from the non-electrode discharge lamp 50 is connected to a compressor 60, and air from the compressor 60 is sent to the inner tube of the discharge tube of the non-electrode discharge lamp apparatus. Air sent to the inner tube is exposed to the ultraviolet rays, and ozone is generated. The tube 16 is connected to water pipes 42 by connectors 41. Water flows into the tube 16 from the left water pipe 42 in the figure. Water in the tube 16 is sterilized by the ultraviolet rays generated by the non-electrode discharge lamp apparatus 50 and ozone generated from the non-electrode discharge lamp apparatus 50. As a result, sterilized water flows to the right water pipe 42 in the figure from the tube 16.

According to this embodiment, water is sterilized by the ultraviolet rays from the non-electrode discharge lamp apparatus 50 and ozone from the non-electrode discharge lamp apparatus 50. As a result, water can be extremely efficiently sterilized. The other effect is the same as the first embodiment of FIG. 8. If the non-electrode discharge lamp apparatus 50 of FIG. 4 is used in this embodiment, water can be sterilized by the active electron in addition to the ultraviolet rays and ozone, so that water sterilizing efficiency can be further improved.

Each embodiment of the non-electrode discharge lamp apparatus generally shows each of the various kinds of structure. However, in the actual product, it is necessary to set the specific structure in consideration of the conditions in designing and manufacturing. Particularly, the mechanical support structure of the discharge tube and the exciting coil, and the structure of the current feeding line to the coils have a great influence on not only electrical and mechanical strength against vibration and impact of the lamp apparatus and reliability but also the irradiation efficiency of ultraviolet rays.

For example, the structure of the fifth embodiment shown in FIG. 6 is favorable in the stability of the current feeding to each exciting coil. However, the large number of lead lines is needed. Moreover, the support structure for these lead lines is needed. As a result, the structure becomes complicated and these lead lines and the support structure interrupt the ultraviolet rays from the discharge tube, and the irradiation efficiency of the ultraviolet rays is reduced. If the large number of lead lines is provided, there is high possibility that these lines will be shortcircuited. Moreover, to reduce the possibility of the shortcircuit, it is necessary to extend these lead lines to the corresponding exciting coils at different passages away from each other. In other words, the position of the connection terminal of each exciting coil must be made different in accordance with the position of each lead line positioned at the different passage. Due to this, it is necessary to manufacture a large number of exciting coils whose position of connection terminal is different from each other. This increases the manufacture cost of the coils, and the assembly of the coils becomes complicated. These disadvantages become considerable as the number of the exciting coils is increased.

Figure 11:
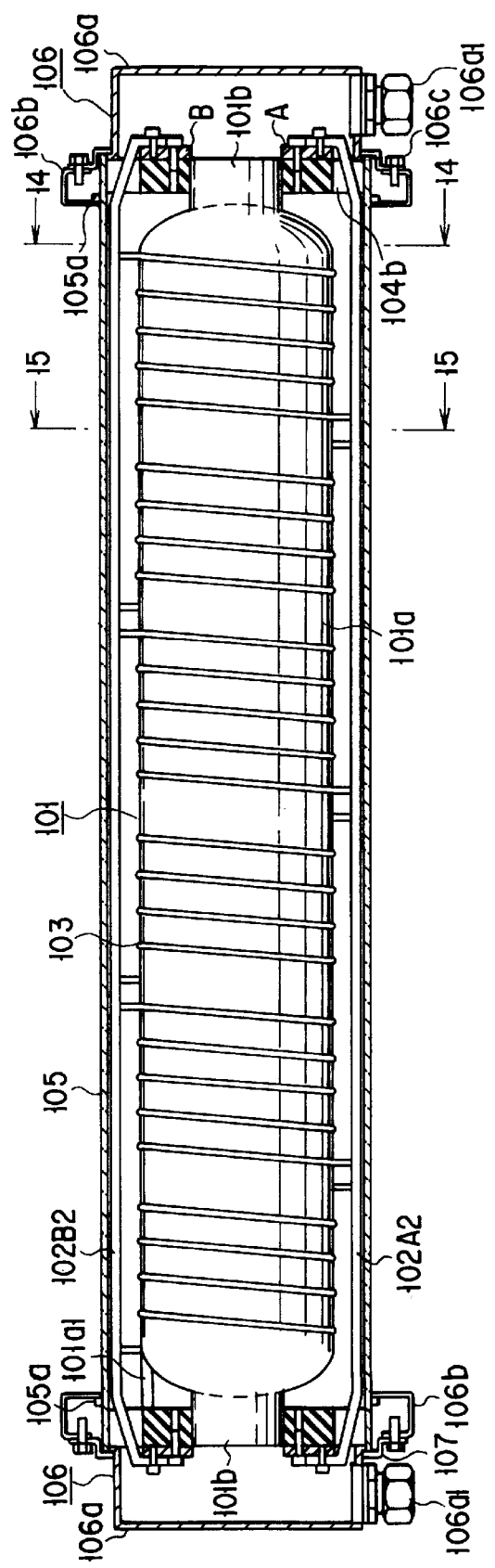
FIG. 11 is a vertical cross-sectional view showing the non-electrode discharge lamp apparatus according to a seventh embodiment of the present invention.
Figure 12:
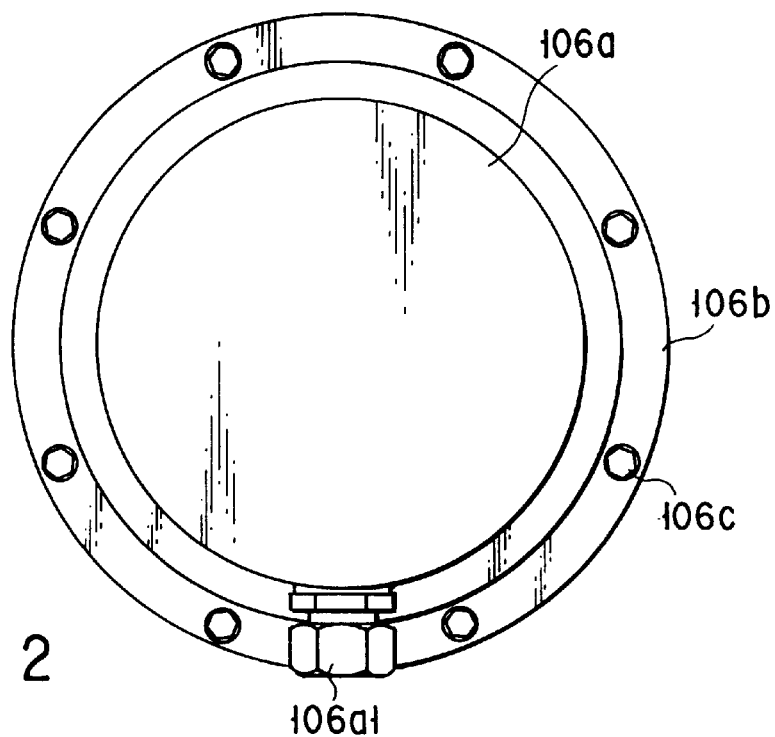
FIG. 12 is a side view showing the lamp apparatus of FIG. 11.
Figure 13:
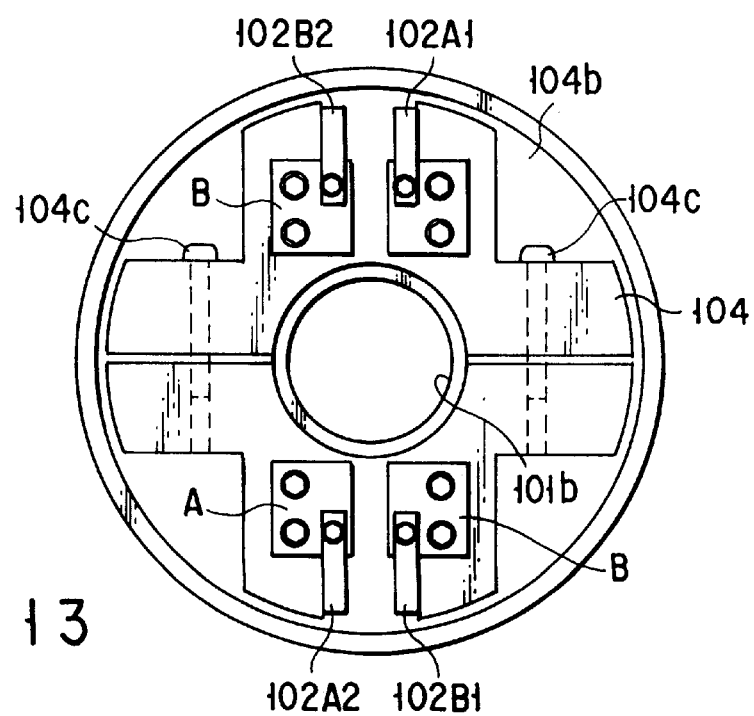
FIG. 13 is a side view showing a state that a cap is detached from the lamp apparatus of FIG. 11.

FIGS. 11 to 15 show a seventh embodiment of the non-electrode discharge lamp apparatus having a favorable specific structure. FIG. 11 is a vertical cross-sectional view showing the non-electrode discharge lamp apparatus, and FIG. 12 is a side view showing the lamp apparatus of FIG. 11. FIG. 13 is a side view showing a state that a cap is detached from the lamp apparatus of FIG. 11.

In FIGS. 11 to 15, reference numeral 101 is a non-electrode discharge lamp; 102A1, 101B1, 102A2, 102B2 are two pairs of exciting coil support bars; 103 is exciting coils; 104 is a insulating member; A, B are terminals, 105 is a vessel; and 106 is a cap member. The non-electrode discharge lamp 101 comprises a discharge tube 101a, an annular member 101b, and a discharge medium contained in the interior of the lamp. The annular member 101b functions as an attaching projection for the discharge tube 101a.

The discharge tube 101a is formed by sealing both ends of the cylinder made of melt quartz glass, and a thin tube 101a1 is projected from one end. The thin tube 101a1 forms the coolest portion while the non-electrode discharge lamp is operated so that mercury steam pressure is maintained to be a suitable value. The annular body 101b is formed by welding the annulus of quartz glass to both ends of the discharge tube 1a. The discharge medium is formed of mercury and argon having suitable pressure.

The exciting coil support bars 102A1 and 102B1, which are opposite to each other to sandwich the lamp 101, form a first pair. The exciting coil support bars 102A2 and 102B2 form a second pair.

The number of exciting coils 103 having about 4.5 turns is six. These coils are arranged along the longitudinal direction of the lamp 101 to have an equal distance. Each coil 103 is formed to have the same structure.

FIG. 14 is a view explaining the connection between the exciting coil and the exciting coil support bars seeing from the cross section along line 14—14 of FIG. 11 in a direction of an arrow. The exciting coil 103 shown in FIG. 14 is the first coil counting from the right in FIG. 11, and the exciting coil 103 is connected to the first pair of exciting coil support bars 102A1 and 102A2.

FIG. 15 is a view explaining the connection between the exciting coil and the exciting coil support bars seeing from the cross section along line 15—15 of FIG. 11 in a direction of an arrow. The exciting coil 103 shown in FIG. 14 is the second coil counting from the right in FIG. 11, and the exciting coil 103 is connected to the second pair of exciting coil support bars 102B1 and 102B2.

Similarly, the other exciting coils are connected to the first and second pairs of exciting coil support bars 102A1, 102A2, 102B1 and 102B2, respectively. Since the exciting coils are excited to have the same polarity. Then, the exciting coil bars 102A1 and 102B1, and 102A2 and 102B2 are the same polarity, respectively.

The insulating member 104 is formed of fluorine plastic. A hole 104a (not shown) for holding the annular 101b is formed at the center. Four notches 104b are formed on the peripheral edge. As a whole, the insulating member 104 is cross-shaped. As shown in FIG. 13, the insulating member 104 is structured to be horizontally cut into two. Then, two portions are combined with screws 104c, and 104c, and fastened to the annular member 101b to be attached thereto. The circumcircle of the insulating member 104 is slightly smaller than the inner diameter of a vessel 105 to be described later.

The terminals A and B are fixed to the outer surface of the insulating member 104. One polarity of the high frequency power source (not shown) is connected to the terminal A, and the other polarity is connected to the terminal B. The exciting coil support bars 102A1 and 102A2 are connected to the terminal A, and the exciting support bars 102B1 and 102B2 are connected to the terminal B. These exciting coil support bars are bent to the terminal sides through the notches 104b formed on the edge of the insulating member 104 so as to be connected to the terminal A or B.

By the above-explained structure, the non-electrode discharge lamp 101, the exciting coil support bars 102A1, 102B1, 102A2, and 102B2, and the exciting coils 103 are formed as one unit.

The vessel 105 is formed of cylindrical quarts glass. In the vessel 105, both ends are opened, and convex portions 105a are formed on the outer periphery close to both ends of the vessel 105, respectively.

Each of a pair of cap members 106 comprises a plate-like cap body 106a, and a ring member 106b. The cap members 106 are attached to both ends of the vessel 105, respectively. Each cap body 106a, which is made of stainless steel, has a closable liquid through hole 106a1. The liquid through hole 106a1 of one cap member 106 is a liquid inlet hole and that of the other cap member 106 is a liquid outlet hole.

One end of the ring member 106b is engaged with the convex portion 105a of the vessel 105, and the other end is fixed to the opening end of the cap body 106a by a plurality of bolts 106c. A packing 107 is provided between the end surface of the cap body so as to seal the interior of the vessel 105 to the outer portion.

The non-electrode discharge lamp 101, the exciting coil support bars 102A1, 102B1, 102A2, 102B2, the exciting coils 103, which are combined as one unit, are contained in the vessel 105.

One cap member 106 has an introducing section (not shown) of high frequency power source which is formed through seal means.

Then, the ultraviolet rays from the non-electrode discharge lamp 101 is emitted to the outer portion from the exciting coils 103 and the exciting coil support bars 102A1, 102B1, 102A2, 102B2 through the vessel 105.

If oxygen or air is circulated in the vessel 105 through the liquid through hole 106a1 formed on the cap body 106, ozone can be generated. The generated ozone can be used in sterilization together with the ultraviolet rays. Also, ozone may be taken up separately to be used for the purpose different from the ultraviolet rays. Moreover, fluid is circulated in the vessel 105, so that the non-electrode discharge lamp can be cooled.

Figure 16:
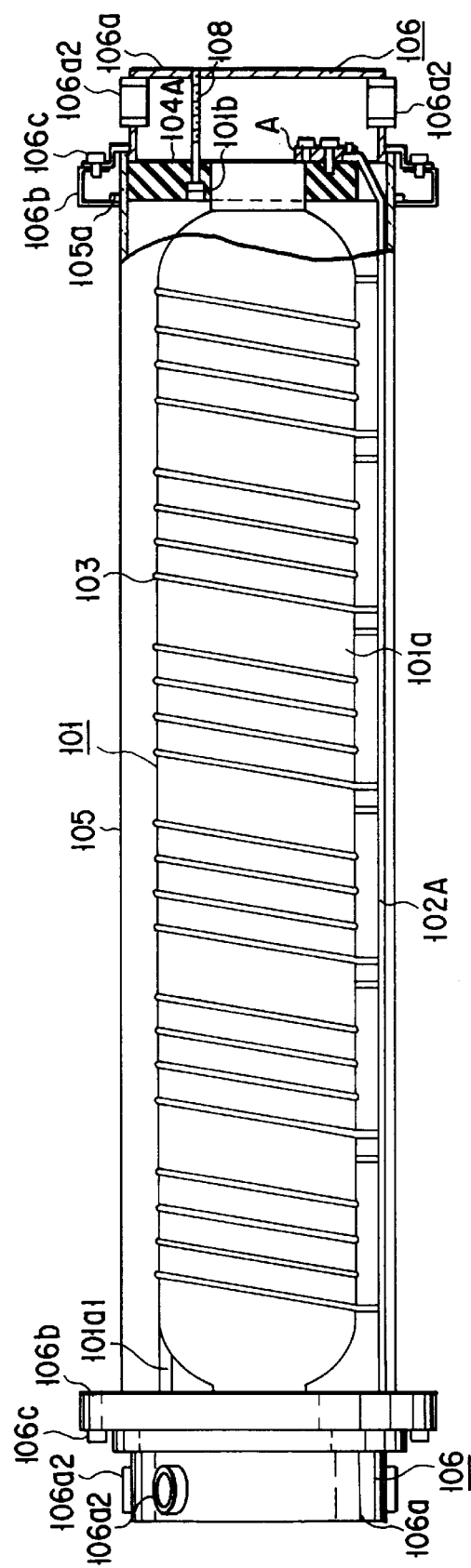
FIG. 16 is a vertical cross-sectional view showing the non-electrode discharge lamp apparatus according to an eighth embodiment of the present invention.
Figure 17:
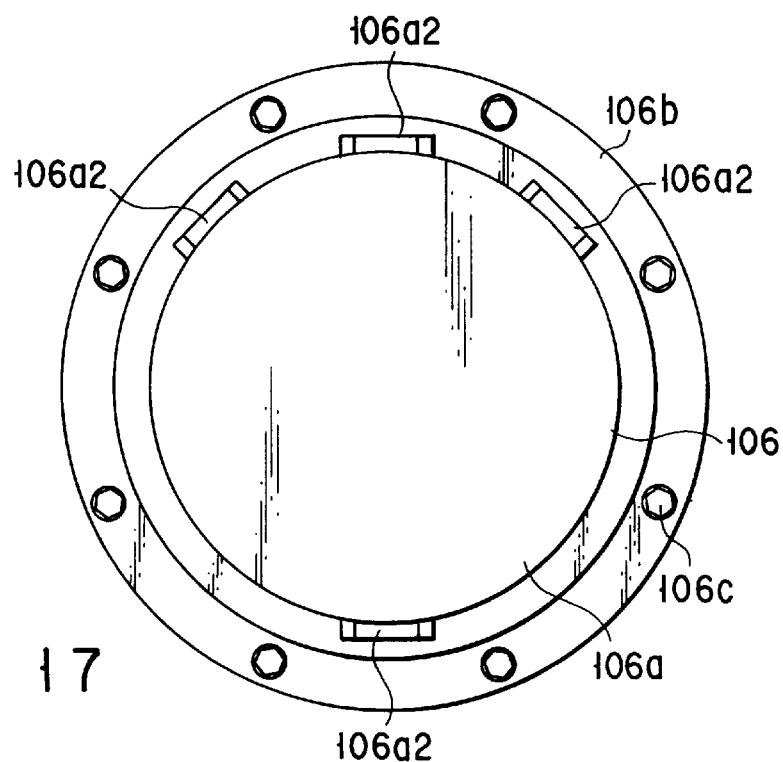
FIG. 17 is a side view of the lamp apparatus of FIG. 16.
Figure 18:
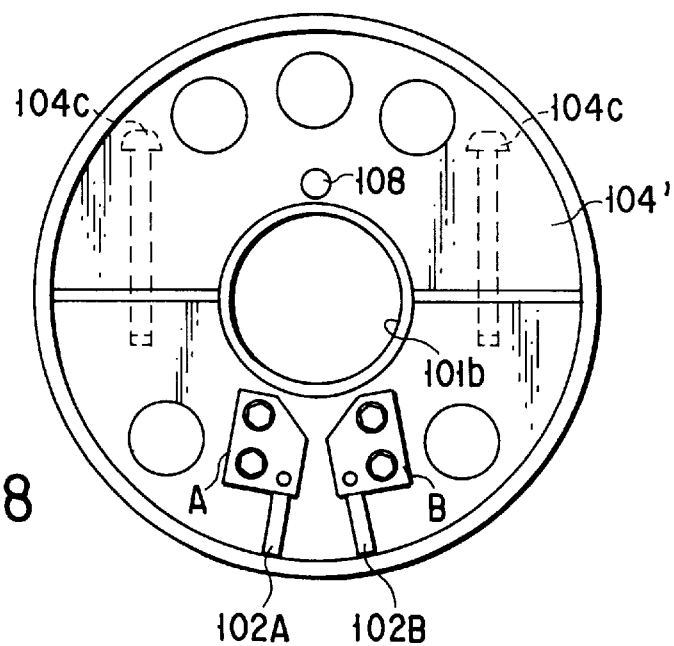
FIG. 18 is a side view showing a state that a cap is detached from the lamp apparatus of FIG. 16.

FIG. 16 is a vertical cross-sectional view showing the non-electrode discharge lamp apparatus according to an eighth embodiment of the present invention. FIG. 17 is a side view of the lamp apparatus of FIG. 16. FIG. 18 is a side view showing a state that a cap is detached from the lamp apparatus of FIG. 16. In these figures, the same reference numerals are added to the portions common to FIGS. 11 to 13, and the explanation is omitted.

This embodiment is different from the seventh embodiment in the point that a pair of exciting coil support bars 102A and 102B. In other words, the exciting coil support bars 102A and 102B are provided to be relatively close to each other at the lower portion of FIG. 16. All exciting coils 103 are connected to the exciting coil support bars 102A and 102B.

The exciting coil support bars 102A and 102B are connected to terminals A and B, which are fixed to one portion of the peripheral edge portion of an insulating member 104'. Thereby, the non-electrode discharge lamp 101, the exciting coils 103, and the exciting coil support bars 102A and 102B are combined as one unit. However, since the portion of the insulating member 104', which is opposite to the terminal, is easily moved, the position, which is opposite to the terminal, is fixed to a cap member 106' by a positioning rod 108.

Four opening 106*a*2 are formed around the cap member 106', which are closable as necessary. The opening 106*a* can be used as liquid through holes and current feeding holes.

According to the non-electrode discharge lamp apparatus of the seventh and eighth embodiments, the pair of exciting coil support bars are extended along the longitudinal direction of the non-electrode discharge lamp, and the exciting coils are connected to the exciting coil support bars. Thereby, the exciting coils are not easily deformed, and the reliability of the apparatus can be improved, and the manufacture and assembly of the exciting coils can be easily executed. Moreover, in using the plurality of coil exciting coils is used, the distance between the exciting coils is narrowed as possible so as to obtain an equal brightness.

Moreover, according to the non-electrode discharge lamp apparatus of the present invention, the annular member is formed on both end of the non-electrode discharge lamp so that the non-electrode discharge lamp is supported through the annular member. Thereby, the non-electrode discharge lamp can be easily supported.

Also, according to the non-electrode discharge lamp apparatus of the present invention, in using the plurality of the pairs of the exciting coil support bars, the non-electrode discharge lamp, the exciting coils, and the exciting coil support bars are mechanically combined as one unit, so that the non-electrode discharge lamp apparatus can be easily used.

Also, according to the non-electrode discharge lamp apparatus of the present invention, the exciting coil support bars are fixed to the insulating member provided to both ends of the non-electrode discharge lamp. Thereby, the exciting coil support bars can be easily and surely fixed.

Moreover, according to the non-electrode discharge lamp apparatus of the present invention, the fluid inlet holes and fluid outlet holes are formed on the cap members attached to both ends of the vessel. Thereby, ozone can be generated as required.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A non-electrode discharge lamp apparatus for exciting gas in a discharge tube from an outer section to emit light, comprising:

discharge tube;

exciting coil means wound on an outer periphery of the discharge tube;

a vessel containing the discharge tube and the exciting coil means, the vessel at least partly formed of ultraviolet ray transmitting material;

at least one pair of lead lines for supplying high frequency electric power to the exciting coil means; and one or a plurality of lead lines guiding means, having a liquid-tight structure, for guiding the lead lines to the vessel.

2. The apparatus according to claim 1, wherein the discharge tube is a straight pipe, attaching projection portions are axially formed on both end portions of the discharge tube, these attaching projection portions are maintained by the vessel, and the discharge tube is maintained at a predetermined position of the vessel.

3. The apparatus according to claim 2, wherein the discharge tube comprises a cylindrical outer tube and an inner tube through which the outer tube is inserted, a discharge space having a cross-sectional annular shape is formed between an inner surface of the outer tube and an outer surface of the inner tube, and both end portions of the inner tube are axially projected from both end portions of the outer tube to form the attaching projection portions.

4. The apparatus according to claim 2, wherein an annular member axially projected is formed on each of both ends of the discharge tube as one body, and the annular member is used as the attaching projection portions.

5. The apparatus according to claim 2, wherein the vessel comprises a cylindrical member formed of ultraviolet ray transmitting material, and a pair of flange members, and the attaching projection portions of both end portions of the discharge tube are maintained by these flange members.

6. The apparatus according to claim 5, wherein the attaching projection portions of the discharge tube are inserted to the holes formed on the flange members of the vessel so as to be maintained.

7. The apparatus according to claim 3, wherein at least one end of the inner tube forming the discharge tube is liquid-tightly passed through the vessel to be guided to the outer section.

8. The apparatus according to claim 7, wherein the other end of the inner tube forming the discharge tube is opened to the outside of the vessel, and a filter element, formed of porous material, is provided in an opening to prevent liquid from being passed and to permit gas to pass.

9. The apparatus according to claim 1, wherein the exciting coil means is a plurality of exciting coils arranged in an axial direction of the discharge tube independently, and these exciting coils are connected in parallel to the lead lines.

10. The apparatus according to claim 1, wherein the discharge tube and the vessel are cylindrically shaped, at least one pair of long and thin conductive members is provided along the axial direction of the vessel, these conductive members are connected to the lead lines, the exciting coil means has a plurality of exciting coils, and these exciting coils are connected to the conductive members, respectively.

11. The apparatus according to claim 10, wherein the conductive members are exciting coil support bars arranged to be separated from the outer periphery of the discharge tube, the exciting coils are connected to the exciting coil support bars, and the electrical connection of the exciting coils and the mechanical maintenance are executed by the exciting coil support bars.

12. The apparatus according to claim 11, wherein the exciting coil support bars form a plurality of pairs, and the plurality of exciting coils is connected to the plurality of pairs of exciting coil support bars, respectively.

13. The apparatus according to claim 11, wherein insulating members are provided to both end portions of the vessel, respectively, and both ends portions of the exciting coil support bars are supported by these insulating members.

14. The apparatus according to claim 13, wherein cap members are provided onto both end portions of the vessel to seal these both end portions, respectively.

15. The apparatus according to claim 14, wherein one cap member has a liquid inlet and the other cap member has a liquid outlet, and liquid is circulated into the vessel through these liquid inlet and outlet.

16. The apparatus according to claim 10, wherein the conductive members contact the outer peripheral surface of the discharge tube to be axially extended, the exciting coils are wound to surround the discharge tube and the conductive members, these exciting coils are fastened, thereby the conductive members are maintained, and a portion between each conductive member and each exciting coil is electrically insulated.

17. The apparatus according to claim 1, further comprising an optical semiconductor member, provided at the outside of the discharge tube, for emitting an electron by irradiation of ultraviolet rays.

18. A liquid treatment apparatus for treating liquid such by irradiation of light, comprising:

a non-electrode discharge lamp apparatus described in any one of claims 1 to 17;

a fluid tube containing the non-electrode discharge lamp therein, and having treating liquid circuited therein;

lead line guiding means, having a liquid-tight structure, for guiding a pair of lead lines guided from the non-electrode discharge lamp apparatus to the outside of the liquid tube; and a high frequency power source for supplying high frequency electric power to the non-electrode discharge lamp through the pair of the lead lines guided to the outside of the liquid tube.

19. The apparatus according to claim 18, wherein the non-electrode discharge lamp apparatus is the non-electrode discharge lamp apparatus described in any one of claims 1 to 17, and said apparatus further comprising pipe guiding means, having a liquid-tight structure, for guiding a pipe for supplying liquid to the non-electrode discharge lamp apparatus to the outside of the liquid tube, and pump means for supplying liquid to the non-electrode discharge lamp apparatus to the pipe.

* * * * *

UNITED STATES PATENT AND TRADEMARK OFFICE
CERTIFICATE OF CORRECTION

Page 1 of 2

PATENT NO. : 6,087,774
DATED : July 11, 2000
INVENTOR(S) : Y. Nakayama et al.

It is certified that error appears in the above-identified patent and that said Letters Patent is hereby corrected as shown below:

| COLUMN | LINE | ERROR |
|---|---|---|
| [75] Pg. 1, col. 1 | Inventors | "Mitaka" should read --Tokyo-- |
| [75] Pg. 1, col. 1 | Inventors | "Machida" should read --Tokyo-- |
| [73] Pg. 1, col. 1 | Assignee | "Kawasaki" should read --Kawasaki-shi-- |
| [57] Pg. 1, col. 2 | Refs. Cited (Other Publs., Item 1 | "Jun. 3," should read --Mar. 6,-- |
| [56] Pg. 1, col. 2 | Abstract 9 of text | after "coils," insert --the-- |
| 14 (Claim 6, | 26 line 3) | "to" should read --into-- |
| 14 (Claim 13, | 63 line 3) | "ends" should read --end-- |

UNITED STATES PATENT AND TRADEMARK OFFICE
CERTIFICATE OF CORRECTION

PATENT NO.   :   6,087,774
DATED        :   July 11, 2000
INVENTOR(S)  :   Y. Nakayama et al.

It is certified that error appears in the above-identified patent and that said Letters Patent is hereby corrected as shown below:

| COLUMN | LINE | ERROR |
|---|---|---|
| 15 (Claim 18, | 17 line 1) | insert a space after "18." |
| 15 (Claim 18, | 17 line 1) | insert --as-- after "such" |
| 16 (Claim 18, | 4 line 8) | delete "guided" |

Signed and Sealed this

Twenty-second Day of May, 2001

Attest:

NICHOLAS P. GODICI

Attesting Officer

Acting Director of the United States Patent and Trademark Office